United States Patent [19]
Eertink

[11] Patent Number: 4,510,266
[45] Date of Patent: Apr. 9, 1985

[54] STEPPING MOTOR CONTROLLER

[75] Inventor: Bastiaan B. B. Eertink, Grubbenvorst, Netherlands

[73] Assignee: Océ-Nederland B.V., Venlo, Netherlands

[21] Appl. No.: 432,631

[22] Filed: Oct. 4, 1982

[30] Foreign Application Priority Data

Oct. 8, 1981 [NL] Netherlands ............ 8104590

[51] Int. Cl.³ ............................................. H02K 29/04
[52] U.S. Cl. ...................................... 318/696; 318/685
[58] Field of Search ............... 365/230, 233, 236, 239; 318/696, 685

[56] References Cited

U.S. PATENT DOCUMENTS

| 3,990,014 | 11/1976 | Hakozaki | 318/696 X |
| 4,140,956 | 2/1979 | Pritchard | 318/696 |
| 4,145,644 | 3/1979 | Liu | 318/696 |
| 4,280,199 | 7/1981 | Osakabe et al. | 365/236 |
| 4,322,827 | 3/1982 | Weber | 365/233 X |

FOREIGN PATENT DOCUMENTS

| 1111903 | 11/1981 | Canada | 318/201 |
| 2850539 | 5/1980 | Fed. Rep. of Germany | |
| 7804540 | 4/1978 | Netherlands | |

Primary Examiner—William M. Shoop
Assistant Examiner—Saul M. Bergmann
Attorney, Agent, or Firm—Albert C. Johnston

[57] ABSTRACT

Pulses from a fixed-frequency pulse generator are counted in a pulse counter to produce a binary number. The binary number is employed to access successive memory addresses which contain data for producing drive pulses for a stepping motor. The memory contents are arranged so that the number of pulses from the pulse generator required to produce a drive pulse decreases during starting and increases during stopping so that smooth acceleration and deceleration of the stepping motor are achieved. In one embodiment, successive locations store "0" or "1" to produce a motor drive signal. In another embodiment, successive locations store numbers which control the length of time until the next drive signal is produced.

15 Claims, 14 Drawing Figures

|     | A            | DUP |
|-----|--------------|-----|
| 0   | 00000000000  | 100 |
| 1   | 00000000001  | 001 |
| 2   |              |     |
|     |              |     |
| 168 | 00010101000  | 001 |
| 169 | 00010101001  | 000 |
| 272 | 00100010000  | 000 |
| 273 | 00100010001  | 001 |
|     |              |     |
| 336 | 00101010000  | 000 |
| 337 | 00101010001  | 001 |
|     |              |     |
| 2022| 11111100110  | 000 |
| 2023| 11111100111  | 001 |
| 2024| 11111101000  | 001 |
|     | 11111101001  | 011 |
|     | 11111101010  | 010 |
|     | 11111101011  | 010 |
|     | 11111101100  | 010 |
|     | 11111101101  | 010 |
|     | 11111101110  | 010 |
| 2031| 11111101111  | 011 |

STEPPING MOTOR CONTROLLER

The invention relates to stepping motors and, more specifically, a method and an apparatus for producing signal pulses for controlling a stepping motor.

Stepping motors can be controlled with open-loop drive systems over a wide speed range with high accuracy. At high drive pulse frequencies, however, stepping motors do not start in a defined manner. Stepping motors have been started from a standstill using low frequencies followed by increasingly higher frequencies until the high frequency associated with the required speed of rotation is reached.

A disadvantage of variable frequency in an open-loop drive system is that it is impossible to start the stepping motor in an arbitrary, defined and predetermined way, or to change its speed, while retaining high accuracy in angle and speed of rotation.

It is accordingly an object of the invention to provide apparatus and a method for generating drive pulses for controlling a stepping motor which overcome the disadvantage of the prior art.

According to an aspect of the present invention, there is provided an apparatus for producing signal pulses for controlling a stepping motor, comprising a pulse generator effective for producing a substantially constant frequency pulse signal, a memory having a plurality of successively addressable memory locations, each of the memory locations having a content, addressing means responsive to the pulse signal for successively addressing the memory locations, the memory including means responsive to the addressing of successive memory locations according to their respective contents for producing a succession of electrical signals to control the stepping motor, and the memory location contents being arranged to produce at least one of an increase in a frequency of the electrical signals during starting of the stepping motor and a decrease in the frequency thereof during stopping of the stepping motor.

According to a further aspect of the invention, there is provided a method of producing signal pulses for controlling a stepping motor, comprising storing a content in each of a multiplicity of memory locations in an addressable memory, successively addressing the memory locations, driving the stepping motor with signals derived from the memory location contents, and arranging the contents in first sets of memory locations having a first condition alternating with second sets of memory locations having a second condition, at least one of the first and second sets having a length which changes progressively with increasing address whereby a frequency of the driving signals changes with increasing address and a speed of the stepping motor is changed.

According to a feature of the present invention, there is provided a method of producing signal pulses for controlling a stepping motor, comprising storing a content in each of a multiplicity of addressable memory locations, the content of each memory location having one of at least first and second possible output states, counting pulses in an UP/DOWN counter, addressing the addressable memory locations with a number in the UP/DOWN counter, arranging the contents in first sets of contiguous addresses having the first output state alternating with second sets of contiguous addresses having said second output state, a length of at least one of the first and second sets changing progressively with change in the addresses, counting in the one of the up and down directions in the UP/DOWN counter in which the length decreases during starting of the stepping motor, and driving the stepping motor with electrical signals derived from the contents of alternately addressed sets of memory locations whereby a speed of the stepping motor is increased during starting thereof.

According to a further feature of the invention, there is provided a method of producing signal pulses for controlling a stepping motor, comprising storing a series of numbers in successive locations in an addressable memory, the respective numbers in said locations changing in magnitude with increasing addresses, counting a first number of fixed frequency pulses related to a magnitude of a number in a first of the locations, producing from the memory a first control pulse for advancing the stepping motor during the counting, repeating the steps of counting and producing to produce a second control pulse, continuing to repeat the steps of counting and producing to produce additional control pulses, and a time separating the control pulses in accordance with magnitudes of said respective numbers whereby a frequency of control pulses progressively changes for changing a speed of the stepping motor.

Starting from a predetermined frequency of a pulse source, the frequency of the control pulses can be varied so that the stepping motor is capable of exactly following their frequency. By a suitable choice of the predetermined stored numbers, a signal of any desired form and frequency pattern can be produced fully adapted to the stepping motor used and to the application in which the stepping motor is installed.

Since the memory locations are consecutively addressed one by one at the pulse source frequency, any arbitrary signal pulse pattern can be generated at the memory output by choice of the contents of the successive memory locations. Thus, the speed of a stepping motor in a specific application can be varied in the most suitable way for that application.

A stepping motor in a specific application can be started in the most suitable way for that application and can be kept moving in accordance with a specific pattern of a selected cluster of counts in memory locations to thus limit the number of possible counts. By limiting the number of possible counts, the number of memory locations addressed by those counts is restricted so that each time the pulse counter traverses the selected cluster of counts and the content of the associated memory locations generate a specific signal pulse pattern at the memory output, those counts are again traversed in the same sequence and the same specific signal pulse pattern is generated afresh.

A stepping motor controlled in the manner described can be used particularly advantageously in applications in which accurate knowledge of the angle of rotation of the stepping motor is required, or in which it is important to precisely control a linear displacement associated therewith during changing the speed of the stepping motor. The expression "changing the speed of the stepping motor" includes starting and stopping of the motor.

The above, and other objects, features and advantages of the present invention will become apparent from the following description read in conjunction with the accompanying drawings, in which like reference numerals designate the same elements.

Figure 1:
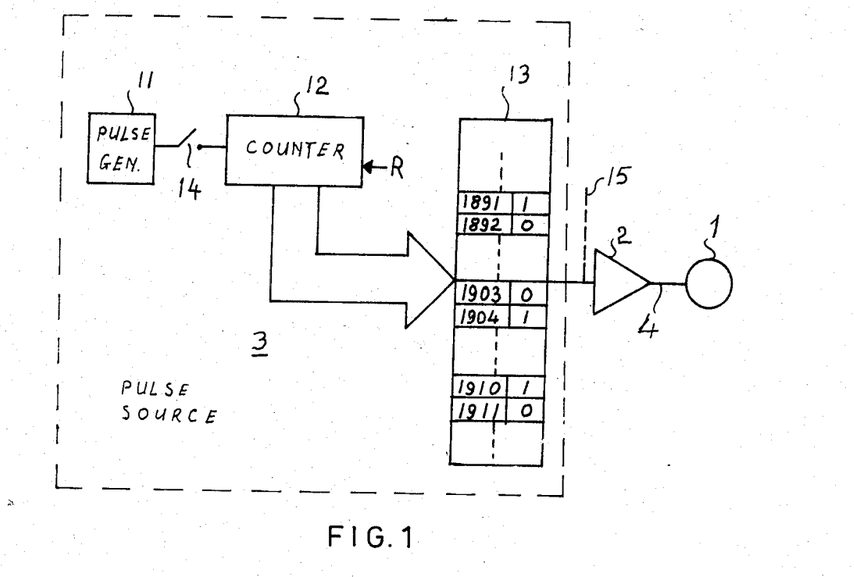
FIG. 1 is a block diagram of a stepping motor controller according to an embodiment of the invention.

Referring to FIG. 1, a stepping motor 1 provided with a known driving circuit (not shown) rotates one step in response to positive-going, or 0-1 transitions of pulses on a line 4 from a power amplifier 2. The pulses are produced by a variable frequency pulse source 3 which includes a fixed-frequency pulse generator 11, a switch 14, a pulse counter 12 and an addressable memory 13. A number of pulses counted in the pulse counter 12 is presented as a corresponding binary number to the address input of memory 13. Each memory location in the memory 13 contains either a "0" or a number other than "0". The output of the memory 13 is connected to the power amplifier 2. Depending upon the content of a memory location being addressed at a given time, the output signal of memory 13 is either a "0" signal or a signal differing from "0". The memory locations of the addressable memory 13 are arranged in groups with consecutive addresses and with the same content. Groups whose memory location content is equal to "0" alternate with groups whose memory location content differs from "0". The size of the groups decreases with increasing address. As an example, two of such groups are shown in FIG. 1, the group having the addresses 1892 . . . 1903 with "0" as content and a group having the addresses 1904 . . . 1910 with "1" as content. In operation, the content of the pulse counter 12 is preset to a predetermined value, such as zero, by a signal at its reset input R. This binary output of the pulse counter 12 thus accesses a predetermined memory location in the addressable memory 13 and causes the output of the addressable memory 13 to assume a "0" or "1" value according to the value stored in it. The switch 14 applies the output of the pulse generator 11 to the pulse counter 12. The binary number at the output of the pulse counter 12 increases by one for each pulse received from the pulse generator 11. Each time the binary number at its memory input advances by one, the "0" or "1" stored in the next memory location of the memory 13 is addressed and is applied to the power amplifier 2. Thus, the memory locations following the starting memory location are addressed in sequence and their contents are fed to the memory output at a frequency controlled by the frequency of the pulse generator 11.

Figure 1A:
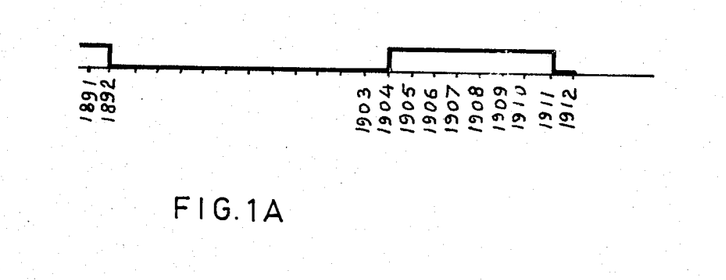
FIG. 1A is an output signal of the controller of FIG. 1.

FIG. 1A shows how the signal at the output of the memory 13 changes on consecutive pulses over the memory locations having addresses 1891 . . . 1912. Assuming that the output signal of pulse counter 12 corresponds to address 1891, the content of which is high or "1", upon the next input from the pulse generator 12 memory address 1892 is accessed. This location produces low or "0" output. Since the content of memory address 1891 produced a "1" and the content of memory address 1892 produced a "0", the output signal of the memory 13 changes from a "1" signal to a "0" signal. Since the stepping motor 1 responds only to a 0-1 or positive-going transition, no movement of stepping motor 1 is produced at this time. The content of each of the memory addresses 1893 . . . 1903 is also "0"; so the output of the memory 13 remains constant at "0" in response to the following eleven (11) pulses from the pulse generator 11 until memory address 1904 is reached. On the next pulse from the pulse generator 11, the output of the pulse counter 12 corresponds to the memory address 1904 which contains a "1". The output of the memory 13 then changes from "0" to "1". The change of "0" to "1" is amplified by the power amplifier 2 and fed to the stepping motor 1, which makes one step in response thereto. During the next six (6) pulses from the pulse generator 11, the output signal from the memory 13 remains unchanged since the memory locations 1905 . . . 1910 all contain "1". In response to the next pulse from the pulse generator 11, the output of the memory 13 returns to "0" because "0" is the content of the memory location having the address 1911.

Beginning with the starting memory location, the content of each successive memory location is fed to the output of the addressable memory in the manner described above, at the frequency controlled by the pulse generator 11. The memory locations of addressable memory 13 are divided into sets. A first set of successively addressed memory locations all have the same content, namely, a "0" or a "1". A next set all have the other content. The remaining sets similarly alternate in content. Thus, as the memory addresses of each set are counted up, a sequence of "1"s or "0"s appears at the output of the memory 13 for a length of time dependent on the number of memory locations in the group. For startup of the stepping motor 1, the sizes of the sets of memory locations are initially large and decrease with increasing addresses. As the sizes of the sets decrease, the output has an increasing frequency to smoothly start and accelerate the stepping motor 1. When the stepping motor reaches its running speed, a constant frequency is applied on a dashed line 15 to the power amplifier 2 to maintain the running speed. The constant frequency may be, for example, a direct output of the pulse generator 11.

The stepping motor can be decelerated to a stop in a similar way. For stopping, the memory 13 may contain a second group of sets of memory locations having sizes which increase with increasing address. The pulse counter 12 may be reset to the first address in this second group of sets. Pulses fed from the pulse generator 11 to the pulse counter 12 then produce via the memory locations of the second group signals to the power amplifier 2 which have a decreasing frequency. The decreasing frequency decelerates the stepping motor 1 to a gradual stop in a predetermined manner. Controlled acceleration and deceleration are important in applications where both rapid rotation and very accurate starting and/or stopping positions of the stepping motor 1 are required.

The present invention enables simple changing of the speed of the stepping motor 1. For this purpose, the output frequency of the pulse generator 11 can be made adjustable according to the required speed of the stepping motor 1.

The present invention also enables starting of the stepping motor 1 with use of any one of a plurality of different speed profiles. A group of sets of memory locations is established for each speed profile. Each group of memory locations includes a starting address and an end address. To select a speed profile, the pulse counter 12 is preset to the starting address associated with the required speed profile. The pulse counter 12 traverses the counts from the starting address to the end address to produce the selected starting profile. If the memory 13 is provided as a replaceable integrated circuit, a memory 13 having the desired content may be placed in the system for each speed profile desired.

Figure 2:
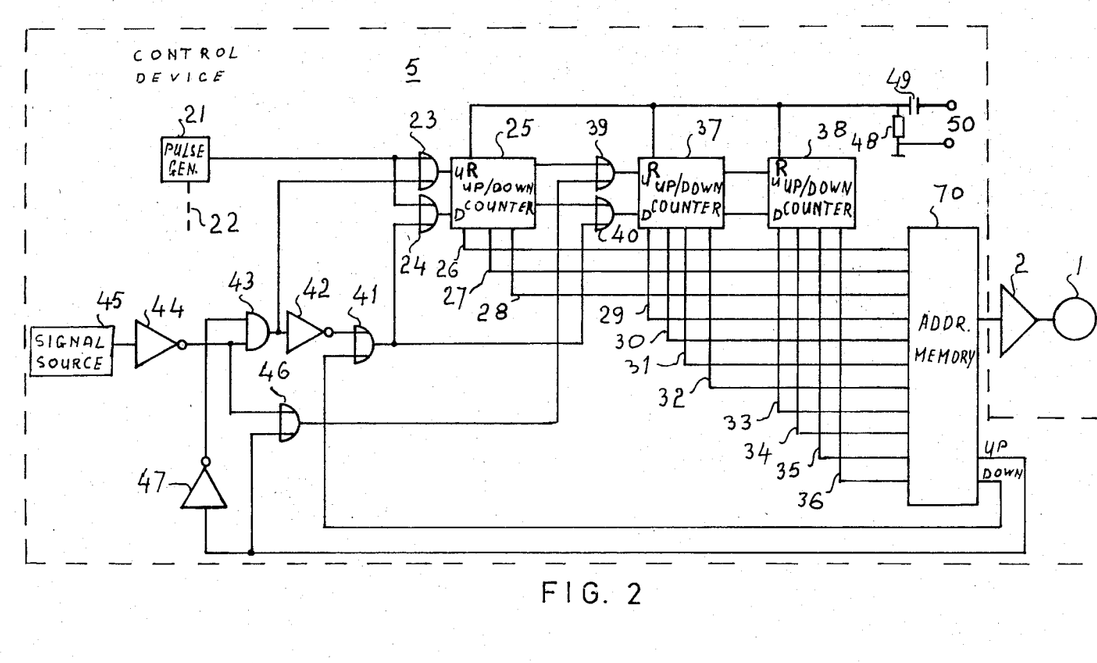
FIG. 2 is a more detailed block diagram of the controller according to an embodiment of the invention.

Referring now to FIG. 2, a control device 5 delivers pulses to a power amplifier 2 feeding a stepping motor 1 via a known driving circuit (not shown), such for example as a Phillips SAA 1027 stepping motor drive circuit, which will respond to each positive-going or 0-1 transition of the pulses of a pulse sequence fed to it so as to generate pulses in known manner to rotate the stepping motor 1 step by step. A pulse generator 21 in the control device 5 delivers pulses at a predetermined constant frequency. The pulse generator 21 can be synchronized with another pulse source as shown diagrammatically by dashed line 22, the frequency or phase of which can fluctuate slightly about an equilibrium value over a period of time. Optionally, the pulse frequency of the pulse generator 21 may be preset to a value which drives the stepping motor 1 at a desired speed.

The pulse output of the pulse generator 21 is connected to a first input of a 2-input OR gate 23 and to a first input of a 2-input OR gate 24. The output of the OR gate 23 is connected to the UP input of an UP/DOWN counter 25. The output of the OR gate 24 is connected to the DOWN input of the UP/DOWN counter 25. The UP/DOWN counter 25 is a 3-bit binary counter. The three output bits of the UP/DOWN counter 25 are connected on lines 26, 27 and 28 to the three least significant bits of the address input of an addressable memory 70. The remaining address inputs of memory 70 receive four output bits of a 4-bit UP/DOWN counter 37 connected via lines 29, 30, 31 and 32 and the four output bits of a 4-bit UP/DOWN counter 38 connected via the lines 33, 34, 35 and 36. The UP output of the UP/DOWN counter 25 is connected to a first input of a 2-input OR gate 39. The output of the OR gate 39 is connected to the UP input of the UP/DOWN counter 37. The DOWN output of the UP/DOWN counter 25 is connected to a first input of a 2-input OR gate 40. The output of the OR gate 40 is connected to the DOWN input of the UP/DOWN counter 37. The UP and the DOWN outputs of the UP/DOWN counter 37 are connected to the UP and the DOWN inputs of the UP/Down counter 38 respectively. The output of a 2-input OR gate 41 is connected to the second input of the OR gate 24 and to the second input of the OR gate 40.

The output of a 2-input AND gate 43 is connected through an invertor 42 to a first input of the OR gate 41. The output of the AND gate 43 is also connected to the second input of the OR gate 23. The output of a signal source 45 is connected through an inverter 44 to a first input of the AND gate 43. The signal source 45 delivers a "1" or a "0" signal depending on whether the counters 25, 37 and 38 are to count up or down, that is, whether the stepping motor 1 is to be started and accelerated to running speed or decelerated from running speed and stopped. The output of inverter 44 is also connected to the first input of a 2-input OR gate 46. The output of OR gate 46 is connected to the second input of the OR gate 39. The second input of OR gate 46 receives one of the output bits of the memory 70, which is hereinafter referred to as the UP or U output. The UP output is also connected through the inverter 47 to the second input of the AND gate 43. A second output of memory 70, which is hereinafter referred to as the DOWN or D output, is connected to the second input of the OR gate 41. A third output of memory 70 which is hereinafter referred to as the PULSE or P output, is connected through the power amplifier 2 to the stepping motor 1. The reset inputs R of the UP/DOWN counters 25, 37 and 38 are connected to the junction of a resistor 48 and a capacitor 49 which are connected in series with one another between the poles of a feed voltage source 50 for the control device 5.

Memory 70 should be capable of storing at least three bits in each memory location, one bit for the PULSE output, one bit for the UP output and one bit for the DOWN output. A system employing an eleven (11) bit addressing is shown, by way of example. A system according to the invention may employ more or less than eleven address bits. The UP/DOWN counters 25, 37 and 38 can be, for example, integrated CMOS circuits of the type 40193. The memory 70 can be one or more 8-bit EPROM integrated circuit devices such as, for example, type 2716 made by Intel.

Figure 2A:
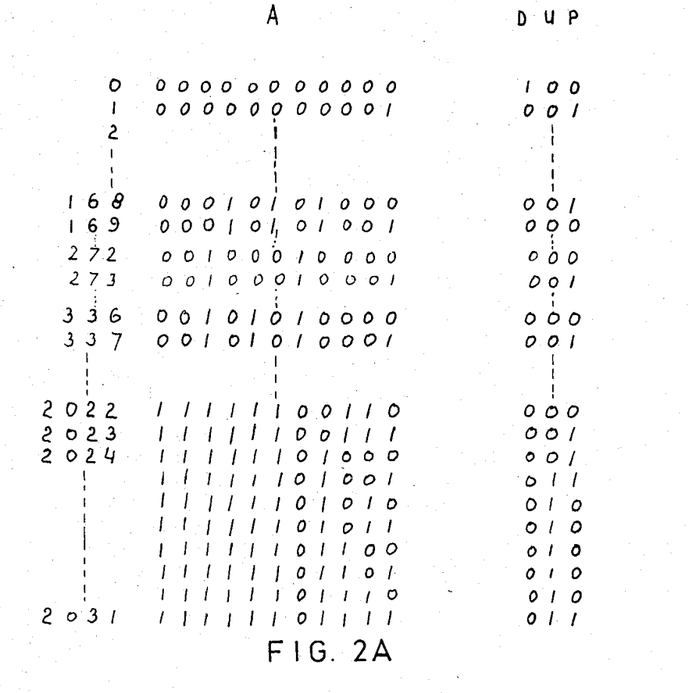
FIG. 2A is an example of the addresses and contents of a number of memory locations of the memory in FIG. 2.

The operation of the control device 5 will now be described, reference being made to FIG. 2A in which the address and the content of the DOWN bit D, the UP bit U and the PULSE bit P are shown in respect of a number of memory locations.

By way of example, the PULSE bit P of the set of memory locations whose addresses run from 00000000001 to 00010101000 inclusive that is, 168 contiguous addresses, is equal to "1" and of the adjoining set of memory locations with addresses 00010101001 to 00100010000 inclusive that is, 104 contiguous addresses, is equal to "0". In the next group of addresses beginning with address 00100010001, the PULSE bit is again "1" and so on. The sizes of the sets decrease continuously as the addresses increase. The content of the memory locations having the addresses 11111100110 to 11111101111 inclusive is also shown for reasons which will be apparent from the following.

When the supply voltage is switched on, a pulse formed at the junction of resistor 48 and capacitor 49 resets the UP/DOWN counters 25, 37 and 38 which thereupon produce a "0" signal on output lines 26-36. Memory address 00000000000 in memory 70, hereinafter also referred to as memory location "0" (=zero decimal), is addressed. Memory location "0" contains the DOWN bit which is applied to OR gate 41.

The UP output and the PULSE output are "0". Assuming that the output of the signal source 45 is a "0" signal indicating that the stepping motor should remain stopped, from truth tables for the AND and OR gates at least one of the inputs of each of the inputs of each of the OR gates 23, 24, 39 and 40 receives a "1". Consequently, none of the outputs of the OR gates 23, 24, 39 and 40 can change and hence none of the output signals of the counters 25, 37 and 38 on lines 26, . . . , 36 can change. The existing situation with a "0" memory address is thus maintained and the stepping motor 1 remains stopped.

The signal source 45 produces a "1" signal to start the stepping motor 1 and a "0" signal in order to stop the stepping motor 1 and keep it stopped. Signal source 45 may be a manually operated switch or alternatively may form part of the control system of a device with which the stepping motor 1 cooperates.

A "1" signal at the output of signal source 45 produces a "0" at the output of inverter 44. This inhibits AND gate 43 and applies a "0" to one input of OR gate 23 and to inverter 42. The resulting "1" from inverter 42 enables OR gates 24 and 40 to maintain a "1" at their outputs. Since one of the inputs of the OR gate 23 is a "0", the counter 25 counts up. After the counter 25 has counted one pulse, memory location "1" is addressed. This memory location contains DOWN bit 0, UP bit 0 and PULSE bit 1, such content being hereinafter referred to as 001.

Both the D signal at the DOWN output and the P signal at the PULSE output change in value in response to the first counted pulse. The change of the DOWN output, which is connected only to an input of the OR gate 41, has no effect on the output of the OR gate 41, and hence no effect on the outputs of the OR gates 24 and 40, because the output of the inverter 42 is a "1" at this time. The change of the signal at the PULSE output from a "0" signal to a "1" signal results in the stepping motor 1 rotating one step. The second pulse counted by the counter 25 addresses memory location "2". The content of memory location "2" is the same as that of memory location "1". The outputs at the DOWN output, the UP output and the PULSE output remain unchanged up to and including the 168th pulse. When the 169th pulse is counted, memory location "169" is addressed. The content of memory location "169" differs from the content of memory location "168" in that the PULSE bit P is "0"; so that signal PULSE output changes from a "1" to a "0". Since the stepping motor 1 is activated in response solely to a 0-1 changeover and not to a 1-0 changeover, stepping motor 1 now remains stationary at the position resulting from the first pulse. This situation does not change up to and including the 272nd pulse.

When the 273rd pulse is counted, memory location "273" is addressed. The content of memory location "273" is the same as the content of memory locations "1", . . . , "168", i.e. 001. The PULSE output changes from a "0" to a "1" and the stepping motor 1 rotates one step. The DOWN output and the UP output remain unchanged. The output signals of the DOWN, UP and PULSE outputs then remain unchanged until the beginning of the next set of addresses is reached. The sizes of sets of memory locations decrease with increasing addresses or, at most, are equal to 168, so that the duration of the "1" signal at the PULSE output is shorter than or equal to the duration of the "1" signal that was present at the PULSE out-put during the pulses 1 to 168, inclusive. The sets of memory locations with consecutive addresses having the same content, such as memory locations "1" to "168", inclusive, and "169" to "272", inclusive, preferably decrease in size with increasing address. Finally, the sets are reduced in size until a set of "0" addresses plus an adjacent set of "1" addresses totals 8 addresses. This gives one output 0-1 changeover per 8 input pulses. This continues until memory location "2023" having a content of 001 is reached. Memory location "2023" conditions the apparatus to assume and retain a constant frequency as long as a "1" remains provided by the signal source 45. The next 8 memory locations "2024" to "2031" inclusive have a special significance. The memory locations "2024", . . . , "2031" control the speed of stepping motor 1 at a constant final running speed. The content of these memory locations is shown in FIG. 2A. The DOWN bit is "0", and the UP bit is "1" except in memory location "2024". The PULSE bit is 1 in the memory locations "2024", "2025" and "2031" and 0 in the memory locations "2026", . . . , "2030". As a result of gating, only the three least significant address bits from the UP/DOWN counter 25 change value after passing memory location "2023". The "1" at the UP output of the memory 70 holds the OR gate 39 enabled and prevents further advance of the UP/DOWN counters 37 and 38. Since the counts of counters 37 and 38 cannot change and the count of counter 25 can change, the final eight addresses from "2024" to "2031" are repeatedly traversed. The UP output "1" via the inverter 47 inhibits the AND gate 43. The inverter 42 and the OR gate 41 enable the OR gates 24 and 40 to prevent them from passing signals to the DOWN inputs of the UP/DOWN counters 25 and 37.

The OR gate 23 still passes pulse signals to the UP input of UP/DOWN counter 25. Consequently, the counting outputs of counter 25 successively traverse the counts 000, 001, 010, 011, 100, 101, 110, 111. It should be noted that to achieve this result, it is not essential for the UP bit in the memory locations "2025", . . . , "2030" to be a 1 but only that the UP bit should be "1" in memory location "2031". This "1" blocks the signal generated by UP/DOWN counter 37.

The following describes a controlled method of stopping stepping motor 1. The memory location "2025", . . . "2030" each contain a "1" at the location of the UP bit. Memory location "2024" contains a 0 at the location of the UP bit. Deceleration and stopping of the stepping motor 1 is begun and maintained when the output of the signal source 45 goes to zero.

On repetitively traversing the memory locations "2024", . . . , "2031" the pulse-pause ratio of the pulses at the output of the memory 70 is 3:5 because three of these memory locations carry a "1" and five of these memory locations carry a "0" at the location of the PULSE bit. It is desirable that this 3:5 ratio be preserved at least during the earliest stages of deceleration to avoid an abrupt phase shift in the PULSE signal applied to the stepping motor 1. If the output signal of the signal source 45 goes to zero when one of the memory locations "2025", . . . "2030" is addressed, the UP/DOWN counter 25 is permitted to continue counting up to "2031" and reset to "2024" before beginning to count down. The UP bit of memory locations "2025", . . . , "2030" is a "1". The UP bit thus holds the OR gates 46 and 39 enabled so that UP/DOWN counter 37 remains blocked from counting up. The "1" UP bit applied to the inverter 47 produces a "0" which maintains the AND gate 43 inhibited. The "0" at the output of the AND gate 43 permits the OR gate 23 to continue transmitting pulses and to thus advance the UP/DOWN counter 25. 25 The "1" at the output of the inverter 42 holds the OR gates 41, 24 and 40 enabled so that UP/DOWN counters are prevented from counting down as long as the UP bit is "1". After counting reaches "2031", on the next pulse, the UP/DOWN counter 25 starts returns count 000, so that memory location "2024" is addressed. The UP bit in memory location "2024" is "0". The output of the inverter 47 enables one input of the AND gate 43. The other input of the AND gate 43 is enabled by the "1" from the inverter 44. The output of the AND gate 43 provides a "1" to inputs of the OR gate 23 and the inverter 42. The OR gates 24 and 40 are now permitted to pass signals to counters 25 and 37 and the OR gates 23 and 39 are enabled at one of their inputs so that they block the signals. The UP/DOWN counters 25, 37 and 38 begin counting down from "2024" to 0 without producing an abrupt phase shift in the signal at the PULSE output of the memory 70. When the count 00000000000 is reached, the DOWN output produces a "1" signal because the content of memory location "0" is 100. This "1" at the DOWN output prevents the OR gates 24 and 40 from passing signals so that counting down is stopped at memory location "0" and the stepping motor 1 remains stopped.

The "0" from the signal source 45, inverted in the inverter 44, along with the "0" from the DOWN output of the memory 70, inverted in the inverter 47, maintains a "1" at the output of the AND gate 43. This prevents pulses being connected through the OR gate 23 to the UP input of the UP/DOWN counter 23.

The control device 5 of FIG. 2 enables a stepping motor to be accelerated to running speed, run, and be decelerated to a stop in a defined manner. A slight modification of the logic circuit between the signal source 45, the UP and the DOWN output and the counter 25, 37 and 38, which would be clear to one skilled in the art without further description, enables a first part of the memory 70 to be used for starting the stepping motor 1 and a second part of the memory to be used for stopping it. The stepping motor 1 can thus be started according to a first speed profile and stopped according to a second speed profile. In the light of the extensive description that has been given with reference to FIG. 2, it is not necessary to describe this modification in detail.

Figure 3A:
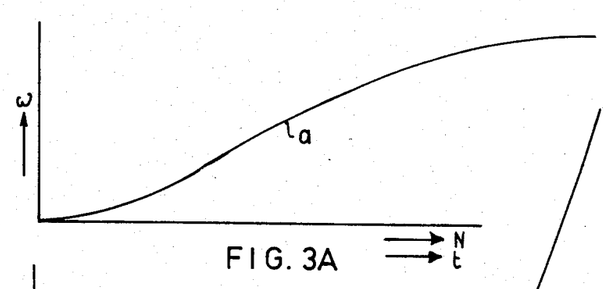
FIG. 3A is a curve showing the relationship between shaft speed and time or number of steps for starting a stepping motor.

FIG. 3A is an example of a speed profile illustrating the required speed of rotation ω against the time t during starting of a stepping motor 1. Curve a is shown as a gradual curve but it should be borne in mind that the speed of rotation ω of a stepping motor at a low ω is an average over a number of steps and has no connection with the speed at which the motor performs the step itself. In applications where it is important to know how the speed of rotation depends upon the angle through which the motor has turned, time t in FIG. 3A can be replaced by the number of pulses N.

Figure 3B:
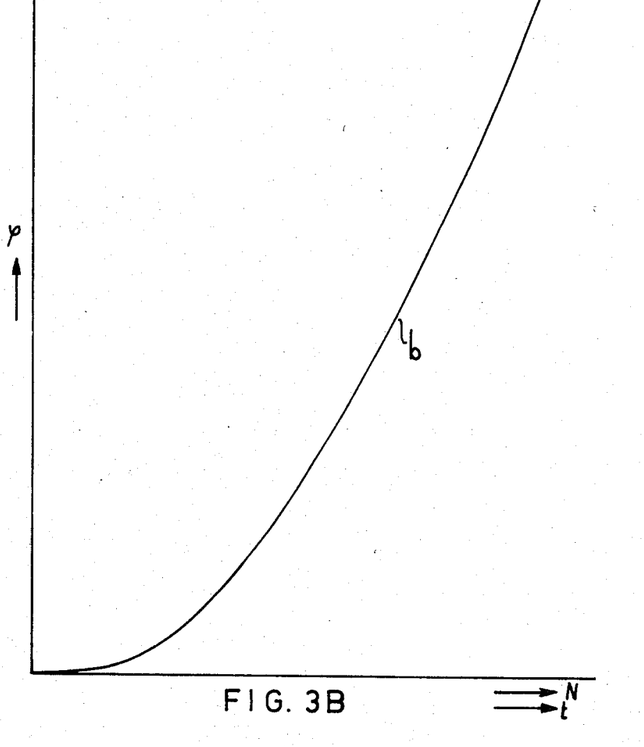
FIG. 3B is a curve showing the relationship between shaft angle and time or number of steps for starting a stepping motor.

FIG. 3B shows the angle φ through which the motor has turned from a starting position against the time t or the number of pulses N if starting is effected as shown in FIG. 3A. Since the frequency of the pulse generator 11 or 21 respectively is predetermined, curve b also represents the relationship between the angle φ through which the motor has turned and the number of pulses N that the pulse generator 11 or 21 respectively has delivered from the beginning of starting.

Figure 4A:
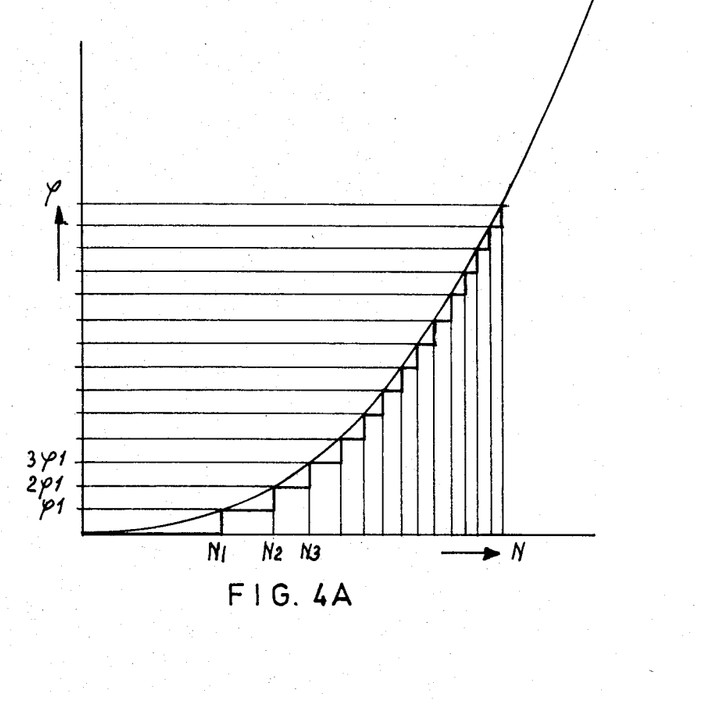
FIG. 4A to 4C inclusive illustrate three ways in which the contents of the memory locations can be determined to produce a desired acceleration profile.
Figure 4B:
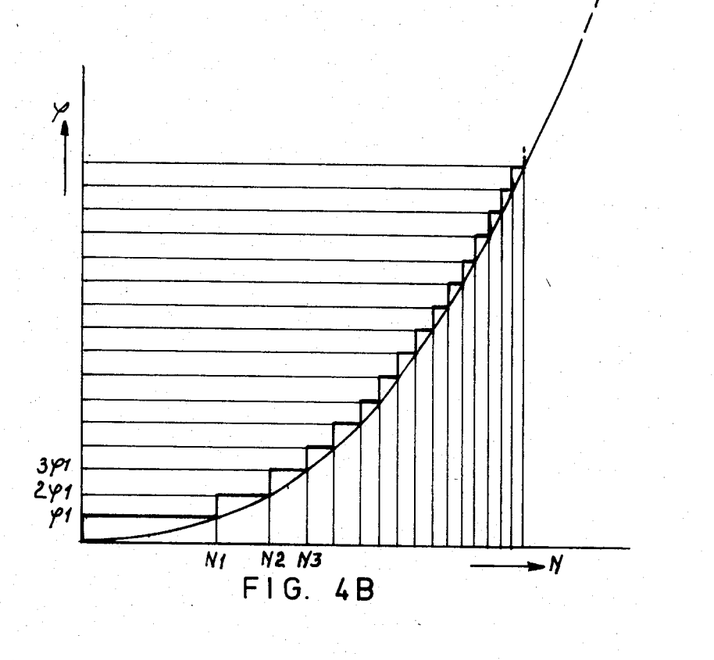
Figure 4C:
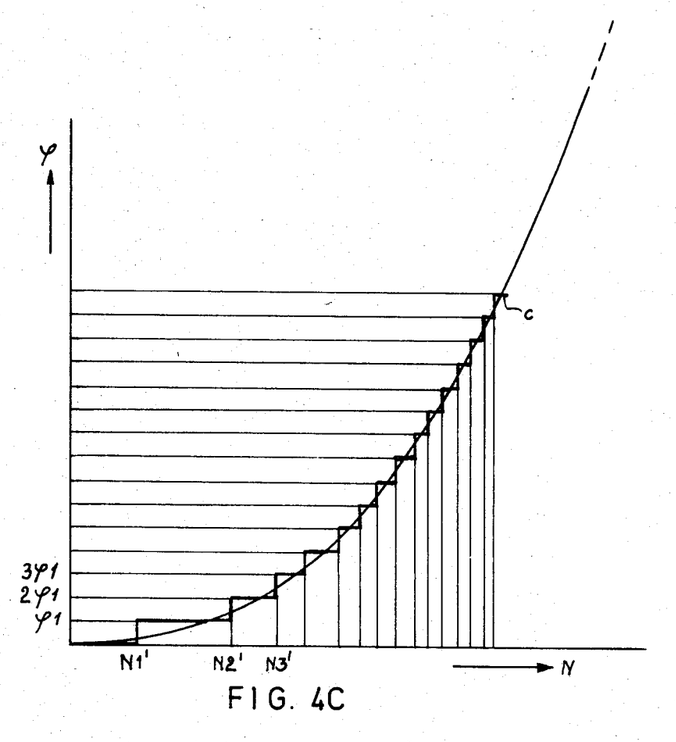

FIGS. 4A to 4C inclusive show how the content of the memory locations of memory 13 or 70 respectively can be determined in order to obtain the profiles reproduced in FIGS. 3A and 3B. Each transverse line along the vertical axis in FIGS. 4A, 4B and 4C denotes one step of the stepping motor while the number of pulses to be counted is plotted along the horizontal axis. According to FIG. 4A, the first set of memory locations is filled with a 0 and the second set, in which a 1 is placed, starts with memory location N1, so that the first step causes a rotation to φ1. The third set again contains 0 while the fourth set which again contains a 1, starts with N2, so that the second step again causes a rotation through an angle φ1 to the angle 2φ1, from the starting state. The sixth set starts with N3, and so on.

Similarly, in FIG. 4B, the first step is made at N=1 (similar to the diagram shown in FIG. 2A), and the next steps are made at N2, N3 and so on. In FIG. 4C, the steps are made at N1', N2', N3', so that the curve c which indicates the angle as a frequency of N oscillates around the required curve. It follows from FIG. 4C that the memory locations 0 to N1'−1 inclusive contain a 0. It is, of course, also possible to approximate the required curve with the curve c by deducting the value (N1'−1) from the counts N1', N2', N3' shown in FIG. 4C, so that the steps take place at the counts 1, (N2'−N1'+1), (N3'N1'+1), and so on.

This also applies to the curve in FIG. 4A, the same profile being obtained by having the steps take place at the counts 1, N2−N1+1, N3−N1+1. It should be noted that FIGS. 4A to 4C inclusive show a graphic determination of the counts N at which the stepping motor makes a step.

It will be clear that if the relationship shown by the curve a or b (in FIGS. 3A and 3B respectively) is known in mathematical form, the counts at which the stepping motor must make a step can also be readily calculated.

FIGS. 5, 6, 7 and 8 are examples of how a control device for starting a stepping motor in a defined manner can be embodied by means of a programmable control system.

Figure 5:
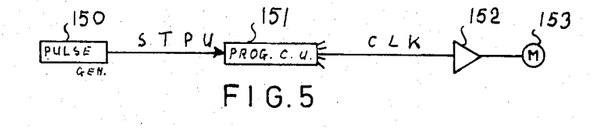
FIG. 5 is a block diagram of a second embodiment of a device according to the invention.
Figure 6A:
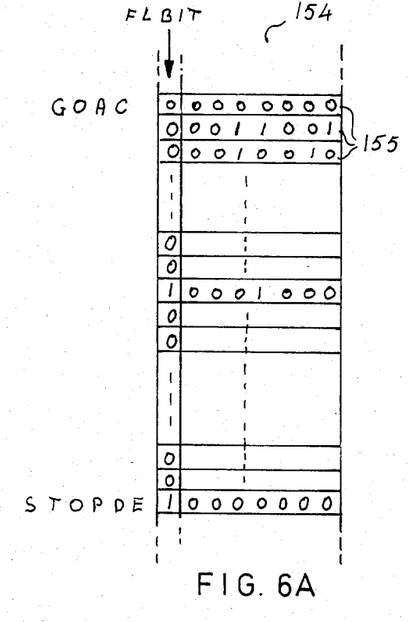
FIG. 6A shows part of a memory used in a device according to FIG. 5.

In FIG. 5, a pulse generator 150 generates pulses STPU at a predetermined frequency. The pulses STPU are counted by a programmable control unit 151. One of the output signals of the control unit is the signal CLK. The signal CLK is the input signal to a pulse-responsive driving circuit (not shown) of a power amplifier 152 whose output is connected to a stepping motor 153. The control unit 151 has a memory 154 in which a program requiring to be performed is stored and in which a number of bit patterns 155 are fixed (FIG. 6A). The bit patterns 155 represent numbers of pulses which must be counted by the control unit 151 before the output signal CLK can change its state.

FIG. 6A shows a part of the memory 154. The first address is identified as GOAC and the last address as STOPDE. One of the bits in the memory 154 is identified as a flag bit FLBIT, the meaning of which will be explained in detail in the following description. In addition to the flag bit FLBIT, each of the memory locations contains a number the magnitude of which decreases from memory location GOAC to the memory location in which the FLBIT changes from "0" to "1". The magnitude of the numbers in the memory locations following the "1" flag bit decreases again until reaching "the memory location STOPDE.

Figure 6B:
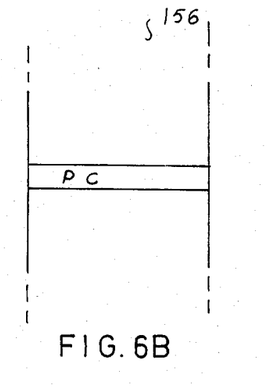
FIG. 6B shows another part of a memory used in a device according to FIG. 5.
Figure 7:
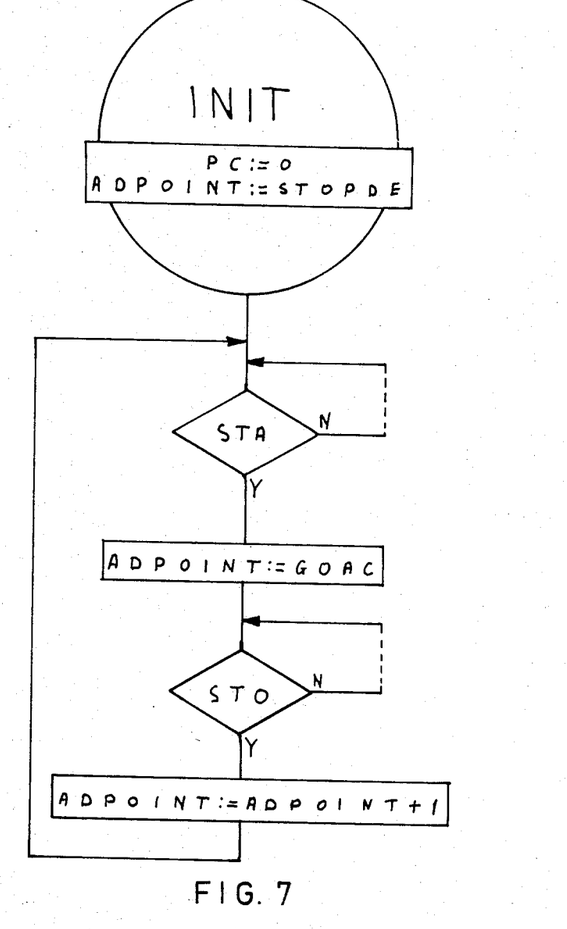
FIG. 7 is a flow diagram of a program used in a device according to FIG. 5.

FIG. 6B represents a section of a read/write memory 156 forming part of the memory of the programmable control unit 151. One of the memory locations PC of the read/write memory 156 acts as a register which keeps track of the count of the number of pulses STPU received by the programmable control unit 151. FIG. 7 shows part of the program which relates to the present invention included in the memory of the programmable control unit 151. An initialization section INIT of the program sets the content of the memory location PC to zero and sets an address pointer ADPOINT equal to STOPDE. A check is then made in the block STA to see whether the stepping motor 153 is to be started. Until a start is enabled by block STA, the control unit 151 can occupy itself with other matters, as shown by the dashed line from the output N to the input of the block STA.

Figure 8:
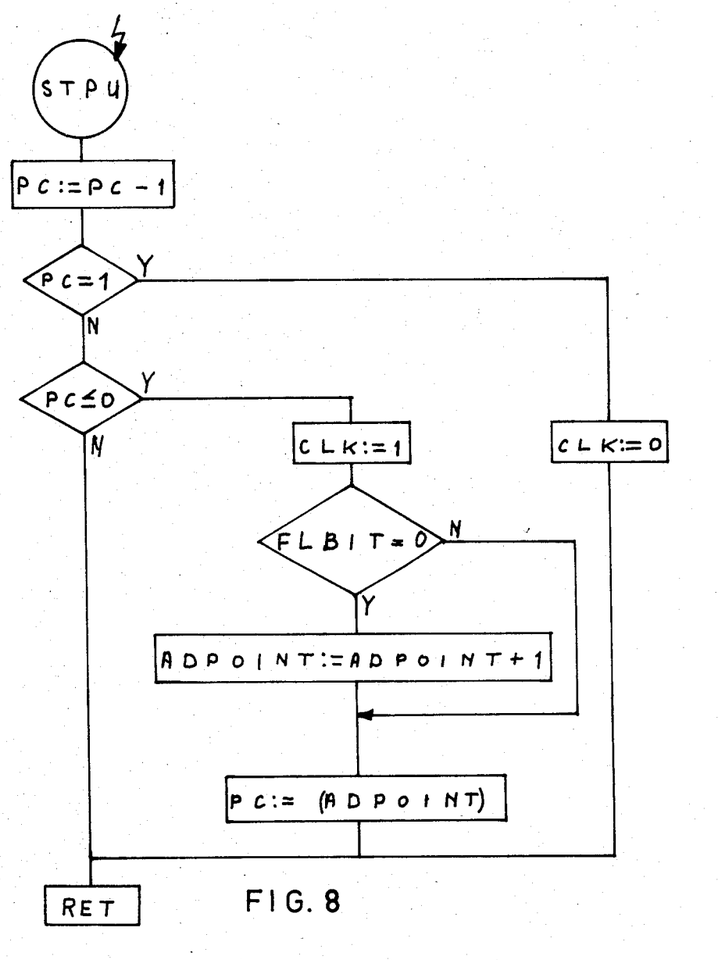
FIG. 8 is a flow diagram of an interrupt program used in a device according to FIG. 5.

When the control unit 151 receives a signal to start the stepping motor 153, the address pointer ADPOINT is made equal to GOAC and the stepping motor 153 is started in the manner described in detail hereinbelow with reference to FIG. 8. The control unit 151 then checks in the block STO to determine whether the started stepping motor 153 is to be stopped. As long as this is not the case, the control unit 151 can occupy itself with other matters, as shown by the dashed line from the output N to the input of the block STO. If a stop is required, the address pointer ADPOINT which, as will be described hereinafter, stopped at the memory location whose FLBIT is equal to 1, is increased by 1. After the stepping motor is stopped, the address pointer ADPOINT is again at the memory location STOPDE and the control unit 151 is again ready to receive a command to re-start the stepping motor 153.

The STPU pulses from pulse generator 150 are connected to an interrupt input of the programmable control unit 151. Each pulse STPU interrupts the current program and enables the priority runnings of an interrupt program. The priority interrupt program is shown in greater detail in FIG. 8. The content of the memory location PC is reduced by 1. Since the content of the memory location PC is initially set to zero by the initialization routine INIT, reducing it by 1 makes the content of the memory location PC equal to $-1$ in response to the first interrupt pulse STPU. A check is made in the "PC=1" block to determine whether the content of the memory location PC is equal to 1. Since this is not true, the process is continued via the output N to the block "PC$\leqq$0". This is true, and so the output signal CLK is made equal to 1 via output Y. A check is then made to determine whether FLBIT is equal to 0. This is not so because the address pointer ADPOINT points to the memory location with the mark STOPDE, whose FLBIT is equal to 1. The output N of the block "FLBIT=0" bypasses the next block and sets the content of the memory location PC equal to the content of the memory location indicated by the address pointer ADPOINT. In this case, the memory location is the one marked STOPDE, the content of which is equal to zero. Upon exiting the interrupt program, storage location PC contains zero. The program will continue to cycle in this way until a box STA indicates that the stepping motor 153 should be started. The CLK output remains equal to 1 and the amplifier 152 a constant DC voltage signal so that the stepping motor 153 remains stopped.

When the stepping motor 153 is to be started, the address pointer ADPOINT is made equal to GOAC. In response to the next interrupt pulse STPU, the content of the memory location PC again becomes equal to $-1$. Via the output N of the block "PC=1" and the output Y of the block "PC$\leqq$0", the signal CLK remains equal to "1". Next, it is determined whether FLBIT is equal to zero. Since the memory location marked GOAC is now addressed, this question is answered in the affirmative and the address pointer ADPOINT is increased by 1 via the output Y of the block "FLBIT=0". As a result, the memory location following the one marked GOAC is now indicated. The content of this memory location is a number, e.g. 25, which is then loaded or written in the memory location PC. The number loaded into memory location PC determines the number of succeeding interrupt cycles during which the output signal CLK will be "1". This concludes the interrupt program and the programmable control unit returns to the interrupted program. In response to the next interrupt pulse STPU, the current program is again interrupted and the content of the memory location PC is reduced by 1 from 25 to 24. The question whether the content of the memory location PC is equal to 1 is again answered in the negative and the question whether the content of the memory location PC is less than or equal to zero is also answered in the negative, thus exiting via N and concluding the interrupt program. The programmable control unit 151 again returns to the interrupted program. In the same way, the signal CLK remains 1 during the succeeding 23 interrupt pulses STPU after the STA signal has enabled starting the stepping motor 153. In response to the 24th interrupt pulse STPU the content of the memory location PC becomes equal to 1. The question whether the content of the memory location PC is equal to 1 is now answered in the affirmative and in response thereto the signal CLK is made equal to zero. This concludes the interrupt program in response to the 24th interrupt pulse STPU and the programmable control unit 151 returns to the interrupted program. In response to the 25th interrupt pulse STPU the content of the memory location PC becomes equal to zero. The question whether the content of the memory location PC is equal to 1 is again answered in the negative and the question whether the content of the memory location PC is smaller than or equal to zero is answered in the affirmative. In response, the signal CLK is again made one. It will be seen that the output CLK has been held equal to "1" for 24 interrupt periods, has been set to "0" for one interrupt period and then has been reset to 1. The 0-1 transition at the end of this one period "0" steps the stepping motor 153 one step. The question whether FLBIT is equal to zero is again answered in the affirmative and the address pointer ADPOINT is raised again by 1. The address pointer ADPOINT now points to the next higher memory location which is two places beyond the memory location marked GOAC and the content of that memory location is loaded or stored in memory location PC.

The new number in location PC is less than 25, e.g. 18. The signal CLK remains 1 until the content of the memory location PC is reduced to 1. When this occurs, the signal CLK is again set to "0" for one interrupt period and then returned to "1". The address pointer ADPOINT is again increased by 1 so that the content of the next higher memory location is now stored in the memory location PC. In this way the successive memory locations shown in FIG. 6A are run through until the memory location whose FLBIT is equal to 1 is reached. This memory location contains, for example, the digit 8. This means that in response to the next 6 interrupt pulses STPU after the address pointer has indicated this memory location, the output signal CLK is equal to 1. In response to the 7th interrupt pulse STPU the content of the memory location PC becomes 1 and in response thereto the signal CLK becomes zero. In response to the following 8th interrupt pulse STPU the content of the memory location PC becomes zero in response to which CLK again becomes equal to 1. Since FLBIT is now not equal to zero, the address pointer ADPOINT is not increased by 1 and continues to point to the same memory location containing the number 8. Via the output N of the block "FLBIT=0" the content of this memory location is again stored in the memory location PC. This cycle repeats time after time. The frequency of the 0–1 changeovers in the signal CLK is thus equal to one-eighth of the frequency of the pulses STPU. The stepping motor 153 is thus controlled with pulses whose frequency is one-eighth of the frequency of the pulses STPU. The stepping motor 153 now rotates in synchronism with the pulse generator 150.

Until the block "STO" indicates that the stepping motor 153 should be stopped, the presence of the FLBIT equal to 1 ensures that the address pointer ADPOINT remains unchanged, so that the content of this memory location is again and again stored in the memory location PC. When the control unit 151 receives the signal that the stepping motor 153 is to be stopped, the block "STO" produces a signal on its Y output permitting the address pointer ADPOINT to be increased by 1. The next time the content of the memory location PC is equal to zero, the signal CLK is again made equal to 1 via the output Y of the block "PC≦0", while the question whether FLBIT is equal to zero is again answered in the affirmative since the number containing the flag bit is no longer in memory location ADPOINT. In response thereto, the address pointer ADPOINT is again increased by 1 and the content of the associated memory location is stored in the memory location PC. In the same way as described hereinbefore, the memory locations up to and including the memory location marked STOPDE are now successively indicated by the address pointer ADPOINT. The numbers in those memory locations become increasingly larger so that the 0–1 changeovers of the signal CLK occur at ever increasing intervals and the stepping motor 153 decelerates. When the address pointer ADPOINT reaches the memory location STOPDE, the signal CLK no longer changes and the stepping motor 153 stops.

In the foregoing description, the content of the memory location PC is always reduced by 1 until its content equals zero. Other ways of counting are possible within the scope of the invention. One possibility is to continually increase the content of the memory location PC until its content is equal to the content of the memory location addressed by the address pointer ADPOINT.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

I claim:

1. Apparatus for generating signal pulses for controlling a stepping motor, comprising:
   a pulse generator effective for producing a substantially constant frequency pulse signal;
   a memory having a multiplicity of successively addressable memory locations, each of said memory locations having a content;
   addressing means responsive to said pulse signal for successively addressing said memory locations;
   said memory comprising output means responsive to the respective contents of said memory locations as they are addressed successively by said addressing means for producing electrical signals having frequencies to control said stepping motor; and
   said contents being arranged to produce in response to said addressing at least one of an increase in the frequency of said electrical signals for starting of said stepping motor and a decrease in said frequency thereof for stopping of said stepping motor.

2. Apparatus according to claim 1, wherein each of said memory locations contains either a "0" or a "1" and said memory locations are arranged in multiple sets of memory locations including sets thereof in which the respective memory locations have the same content and sets thereof having different numbers of memory locations, the number of memory locations in a set thereof controlling a time during which said memory output means maintains a state produced by a said content.

3. Apparatus according to claim 2, wherein said addressing means includes a counter, said counter being effective to produce a changing digital number in response to said pulse signal, each value of said digital number being applied to a related one of said memory locations.

4. Apparatus according to claim 1, 2, or 3, wherein said memory locations include a subset thereof in which the content of at least one of the subset memory locations differs from that of at least one other of them and said addressing means is effective to repetitively address through said subset of memory locations to produce a predetermined substantially constant frequency of said electrical signal, said predetermined frequency being lower than said pulse signal frequency.

5. Apparatus according to claim 1, wherein said addressing means includes at least one UP/DOWN counter and means for controlling said at least one UP/DOWN counter to count one of up and down during acceleration of said stepping motor and to count the other of up and down during deceleration of said stepping motor, each said content including a bit effective to control a signal state of said memory output means, said contents being arranged in successive sets of said memory locations including sets thereof containing bits of one type alternating with sets thereof containing bits of another type, at least some of said sets progressively decreasing in length when addressed in a first sequence for deceleration of said stepping motor and progressively increasing in length when addressed in a second sequence for deceleration of said stepping motor.

6. Apparatus according to claim 5, further comprising means for producing in succession two signal states of said memory output means with a fixed ratio of output signals to pulses of said pulse signal for constant speed running of said stepping motor and means for maintaining said fixed ratio at least to a beginning of deceleration from said constant speed running.

7. Apparatus according to claim 1, wherein said memory locations include first sets of memory locations having a first signal state arranged in alternation with second sets of memory locations having a second signal state, the respective numbers of memory locations in the sets of at least one of said first sets and said second sets changing progressively with change in address.

8. Apparatus according to claim 7, further comprising means operative when the memory locations of said first sets and said second sets have been addressed to continue said addressing means active for repetitively addressing a limited subset of said memory locations and thereby producing said signals at a substantially constant frequency.

9. Apparatus according to claim 8, wherein said subset includes a fixed number of memory locations having said first signal state and a fixed number of memory locations having said second signal state.

10. A stepping motor controller according to claim 1, further comprising means for stopping said pulse generator at an end of stopping of said stepping motor.

11. Apparatus according to claim 1, wherein said contents comprise in each of said memory locations a digital number which in response to a corresponding number of pulses of said pulse signal determines a duration of a signal state of said electrical signals.

12. A method of producing signal pulses for controlling a stepping motor, comprising:
   storing a content in each of a multiplicity of memory locations in an addressable memory;
   successively addressing said memory locations; and
   producing from certain sets of said memory locations as they are addressed, according to respective contents of said sets, output signals for driving said stepping motor;
   said sets of memory locations including first sets thereof having a first signal state alternating with second sets of memory locations having a second signal state, at least one of said first sets and second sets containing in the respective sets thereof numbers of said memory locations which change progressively with increasing address whereby said output signals are produced at a frequency that changes with increasing address for correspondingly changing the speed of said stepping motor.

13. A method of producing signal pulses for controlling a stepping motor, comprising:
   storing a content in each of a multiplicity of addressable memory locations;
   said content in each memory location having one of at least first and second possible signal states;
   generating control pulses at a predetermined frequency;
   counting said control pulses in an UP/DOWN counter and producing from it signals for successively addressing said addressable memory locations;
   the contents of said memory locations being arranged in first sets of contiguous addresses having said first signal state alternating with second sets of contiguous addresses having said second signal state, with the number of addresses in the respective sets of at least one of said first sets and said second sets changing progressively with change in said addresses;
   applying said signals from said UP/DOWN counter to said memory locations successively in the one of the up and down directions in which said number of addresses decreases; and
   producing in response to the respective signal states of said sets of addressed memory locations output signals at increasing frequency whereby the speed of said stepping motor is increased during starting thereof.

14. A method according to claim 13, and after said starting repetitively addressing a subset of said memory locations including at least one memory location the content of which has said first signal state and at least one memory location the content of which has said second signal state to produce output signals at a rate corresponding to a required running speed of said stepping motor.

15. A method according to claim 13 or 14, further comprising applying said signals from said UP/DOWN counter successively to said memory locations of said first sets and said second sets in the other of said directions, in which said number of addresses increases, to produce signal pulses at decreasing frequency for stopping said stepping motor; and thereafter cutting off said counter signals to maintain said stepping motor in a stopped condition.

* * * * *